(12) United States Patent
Brück

(10) Patent No.: US 8,551,430 B2
(45) Date of Patent: Oct. 8, 2013

(54) METHOD FOR THE SELECTIVE CATALYTIC REDUCTION OF NITROGEN OXIDES IN EXHAUST GAS FROM AN INTERNAL COMBUSTION ENGINE, AND EXHAUST SYSTEM

(75) Inventor: Rolf Brück, Bergisch Gladbach (DE)

(73) Assignee: EMITEC Gesellschaft fuer Emissionstechnologie mbH, Lohmar (DE)

( * ) Notice: Subject to any disclaimer, the term of this patent is extended or adjusted under 35 U.S.C. 154(b) by 642 days.

(21) Appl. No.: 12/015,195

(22) Filed: Jan. 16, 2008

(65) Prior Publication Data

US 2008/0112872 A1   May 15, 2008

Related U.S. Application Data

(63) Continuation of application No. PCT/EP2006/007196, filed on Jul. 21, 2006.

(30) Foreign Application Priority Data

Jul. 29, 2005 (DE) .......................... 10 2005 035 554

(51) Int. Cl.
*B01D 53/56* (2006.01)
*B01D 47/00* (2006.01)

(52) U.S. Cl.
USPC ........ 423/210; 423/239.1; 423/235; 423/375; 422/156; 422/172

(58) Field of Classification Search
None
See application file for complete search history.

(56) References Cited

U.S. PATENT DOCUMENTS 5,628,186 A   5/1997   Schmelz
5,785,937 A   7/1998   Neufert et al.
(Continued)

FOREIGN PATENT DOCUMENTS

DE   43 15 278 A1   11/1994
DE   197 40 702 C1   11/1998
(Continued)

OTHER PUBLICATIONS

English translation of Korean Office Action dated Jan. 13, 2010.

*Primary Examiner* — Melvin C Mayes
*Assistant Examiner* — Sheng H Davis
(74) *Attorney, Agent, or Firm* — Laurence A. Greenberg; Werner H. Stemer; Ralph E. Locher

(57) ABSTRACT

A method for the selective catalytic reduction of nitrogen oxides ($NO_x$) in the exhaust gas from an internal combustion engine includes providing an exhaust system having: an SCR catalytic converter, a reagent addition point upstream of the SCR catalytic converter for adding at least one of a reducing agent and a reducing agent precursor, and a structure which the exhaust gas can at least flow around and is disposed immediately downstream of the reagent addition point. The method determines a nitrogen oxide content of the exhaust gas, determines a temperature of the structure, determines a quantity of reagent required for reduction of the nitrogen oxide content which is determined, determines a temperature of the structure after addition of the quantity of reagent, compares the temperature of the structure with a predeterminable target temperature, calculates the temperature of the structure using at least one of the following measures, if the temperature is lower than the target temperature: adding a reduced quantity of reagent, and increasing at least one of the temperature of the structure and an exhaust gas temperature until the temperature of the structure, after addition of the quantity of reagent, is greater than or equal to the target temperature, and adds the quantity of reagent through the reagent addition point and, if appropriate, increases the temperature.

14 Claims, 1 Drawing Sheet

(56) References Cited

U.S. PATENT DOCUMENTS

| | | |
|---|---|---|
| 6,119,448 A | 9/2000 | Emmerling et al. |
| 6,173,568 B1 | 1/2001 | Zurbig et al. |
| 6,871,489 B2 | 3/2005 | Tumati et al. |
| 6,928,807 B2 | 8/2005 | Jacob et al. |
| 7,028,465 B2 | 4/2006 | Ripper et al. |
| 2003/0209011 A1 | 11/2003 | Duvinage et al. |
| 2004/0003588 A1* | 1/2004 | Nakatani et al. ............ 60/286 |
| 2004/0040288 A1 | 3/2004 | Jacob et al. |
| 2004/0206069 A1 | 10/2004 | Tumati et al. |
| 2005/0013756 A1* | 1/2005 | Amou et al. ............ 423/239.1 |
| 2007/0289291 A1* | 12/2007 | Rabinovich et al. ............ 60/286 |

FOREIGN PATENT DOCUMENTS

| | | |
|---|---|---|
| DE | 197 36 384 A1 | 2/1999 |
| DE | 101 00 420 A1 | 7/2002 |
| EP | 1 338 562 A1 | 8/2003 |
| EP | 1 469 173 A1 | 10/2004 |
| WO | WO2004/113691 | * 12/2004 |

* cited by examiner

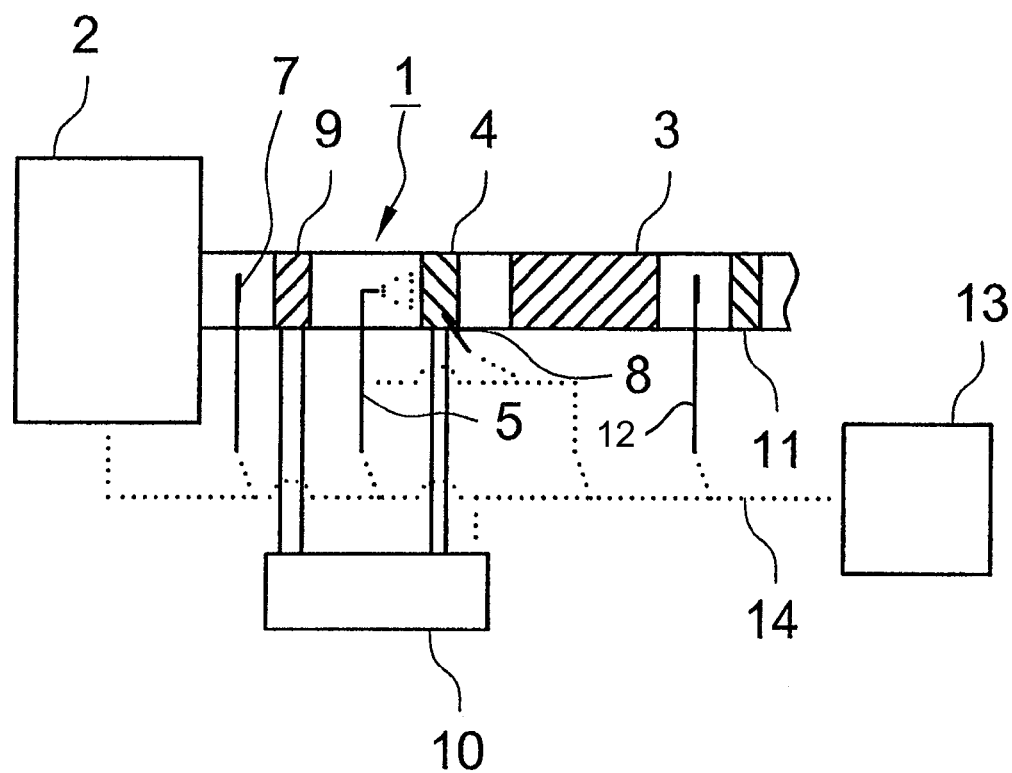

METHOD FOR THE SELECTIVE CATALYTIC REDUCTION OF NITROGEN OXIDES IN EXHAUST GAS FROM AN INTERNAL COMBUSTION ENGINE, AND EXHAUST SYSTEM

CROSS-REFERENCE TO RELATED APPLICATIONS

This is a continuation, under 35 U.S.C. §120, of copending international application No. PCT/EP2006/007196, filed Jul. 21, 2006, which designated the United States; this application also claims the priority, under 35 U.S.C. §119, of German patent application No. DE 10 2005 035 554.4, filed Jul. 29, 2005; the prior applications are herewith incorporated by reference in their entirety.

BACKGROUND OF THE INVENTION

Field of the Invention

The present invention relates to a method for the selective catalytic reduction of nitrogen oxides in the exhaust gas from an internal combustion engine, in particular in the exhaust system of motor vehicles. The present invention also relates to a corresponding exhaust system. The invention deals in particular with controlling the addition of a reducing agent or a reducing agent precursor to the exhaust gas.

Numerous countries throughout the world have implemented statutory regulations which set an upper limit for the level of certain substances in the exhaust gas from internal combustion engines. They are generally substances which it is undesirable to emit to the environment. One of those substances is nitrogen oxide ($NO_x$), the level of which in the exhaust gas must not exceed statutory emission limits. Due to the boundary conditions, for example the structure of the internal combustion engines, with a view toward achieving favorable fuel consumption and the like, avoiding the emission of nitrogen oxides within the engine so as to lower the level of the nitrogen oxides in the exhaust gas, is of only limited use, and consequently exhaust gas aftertreatment is required in order to comply with relatively low limits. In this context, it has been seen that selective catalytic reduction (SCR) of the nitrogen oxides is advantageous. The SCR method requires a reducing agent which contains nitrogen. In particular, the use of ammonia ($NH_3$) as a reducing agent has proven to be one possible alternative. Due to the chemical properties and statutory guidelines in many countries, the ammonia is not usually held in the form of pure ammonia, since that can lead to problems in particular in the context of motor vehicles or other mobile applications. Rather, instead of storing the reducing agents themselves, reducing agent precursors are often stored and carried along in the vehicle. A reducing agent precursor is to be understood in particular as meaning a substance which cleaves off the reducing agent or can be chemically converted into the reducing agent. By way of example, urea represents a reducing agent precursor for the reducing agent ammonia. Other possible reducing agent precursors for ammonia as a reducing agent include ammonium carbamate, isocyanic acid or cyanuric acid.

The chemical conversion of the reducing agent precursor into the reducing agent, the cleaving of the reducing agent from the reducing agent precursor and a possible change in the state of the reducing agent precursor and/or the reducing agent are generally based on endothermic processes, which require the input of energy. That input of energy generally leads to a drop in the temperature of the exhaust gas and/or of components in the exhaust system. However, it is known that a temperature change during a chemical reaction also shifts the reaction equilibrium of the reaction. In addition to the reaction products which are actually desired, undesirable by-products may also form, depending on the current position of the reaction equilibrium.

SUMMARY OF THE INVENTION

It is accordingly an object of the invention to provide a method for the selective catalytic reduction of nitrogen oxides in exhaust gas from an internal combustion engine, and an exhaust system, which overcome the hereinafore-mentioned disadvantages of the heretofore-known methods and devices of this general type and in which the formation of undesirable by-products, when providing the reducing agent, is effectively avoided.

With the foregoing and other objects in view there is provided, in accordance with the invention, a method for the selective catalytic reduction of nitrogen oxides ($NO_x$) in the exhaust gas from an internal combustion engine. The method comprises providing an exhaust system for the exhaust gas from the internal combustion engine, providing an SCR catalytic converter in the exhaust system, providing a reagent addition point in the exhaust system upstream of the SCR catalytic converter for adding at least one of a reducing agent and a reducing agent precursor, and providing a structure which the exhaust gas can at least flow around. The structure is disposed immediately downstream of the reagent addition point in the exhaust system. The method includes:

1.1) determining a nitrogen oxide content of the exhaust gas;
1.2) determining a temperature of the structure;
1.3) determining a quantity of reagent required for reduction of the nitrogen oxide content determined in step 1.1);
1.4) determining a temperature of the structure after addition of the quantity of reagent;
1.5) comparing the temperature of the structure with a predeterminable target temperature;
1.6) calculating the temperature of the structure using at least one of the following measures, if the temperature is lower than the target temperature:
   1.6a) adding a reduced quantity of reagent, and
   1.6b) increasing at least one of the following temperatures:
      1.6b.1) the temperature of the structure and
      1.6b.2) an exhaust gas temperature,
   until the temperature of the structure, after addition of the quantity of reagent, is greater than or equal to the target temperature; and
1.7) adding the quantity of reagent through the reagent addition point and, if appropriate, increasing the temperature according to step 1.6b).

In the context of the present invention, directly downstream is to be understood as meaning that the structure represents the structure which is the next exhaust system component downstream of the reagent addition point, as seen in the direction of flow. The SCR catalytic converter is in particular a structure through which the exhaust gas can flow, such as for example a honeycomb body which is provided with a suitable coating. This may in particular be a titanium dioxide (anatase)-supported vanadium/tungsten mixed oxide and/or metal-exchanged zeolites, preferably iron zeolites, in particular of the X, Y, ZSM-5 and/or ZSM-11 type. The honeycomb bodies which are used may in particular be standard ceramic and/or metallic honeycomb bodies that have cavities, such as for example passages, which an exhaust gas can at least flow through. It is preferable for the honeycomb body to be formed from at least one at least partially structured metallic layer. In this case, the metallic layer may include sheet-metal foils and/or porous metallic layers. The honeycomb body is preferably produced by winding at least one at least partially structured metallic layer and if appropriate at least one substantially smooth metallic layer or by stacking at least one at least partially structured layer and if appropriate at least one substantially smooth layer and intertwining at least one stack formed in this way.

Preference is given to a method in which the reagent added is ammonia as a reducing agent and/or urea as a reducing agent precursor. In this context, the addition of urea as a solid and/or in the form of an aqueous urea solution is preferred.

In this case, depending on the temperature in the SCR catalytic converter, the following primary reaction takes place:

In this case, nitrogen monoxide (NO) is reacted with nitrogen dioxide ($NO_2$) and ammonia ($NH_3$) to form molecular nitrogen ($N_2$) and water ($H_2O$). The provision of the reducing agent ammonia from a reducing agent precursor (urea) usually involves a multistage reaction, in which thermolysis and/or hydrolysis is often carried out. In the case of thermolysis, urea (($NH_2)_2CO$) is thermally converted into ammonia and isocyanic acid (HCNO). This is followed by hydrolysis, in which the isocyanic acid is reacted with water to form ammonia and carbon dioxide:

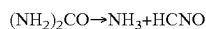

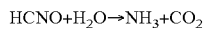

In particular, the hydrolysis and thermolysis are often carried out at a hydrolysis catalyst, which is usually applied in and/or on a coating of a honeycomb body. Depending on the temperature of the hydrolysis catalytic converter, in addition to the desired primary reactions mentioned above, secondary reactions also occur and in some cases result in undesirable reaction products. In the preferred system indicated above, in which ammonia is used as a reducing agent and urea is used as a reducing agent precursor, in addition to the formation of ammonia as indicated above, it is also possible that, for example, biuret (($NH_2CO)_2NH$) may form. Biuret represents a viscous product which can block the passages of the hydrolysis catalytic converter when it is being formed on the latter. In that way, firstly the yield of ammonia which is achieved is reduced, and secondly the passages of the honeycomb body start to clog up. Biuret can only be removed from the honeycomb body with very considerable difficulty, and consequently it is advantageous for the temperature at which the thermolysis and/or hydrolysis of the urea takes place to be selected in such a way that no biuret is formed, since clogging of passages in the hydrolysis catalytic converter can lead to failure of that catalytic converter and therefore to inadequate conversion of urea into ammonia.

In principle, step 1.3) of the invention is based on a stoichiometric reaction of the nitrogen oxide with the reducing agent. When the reducing agent precursor and/or the reducing agent is added in the exhaust gas, the temperature of the exhaust gas is reduced, as outlined above, and therefore the temperature of the components through or around which the exhaust gas flows is also reduced. This is not critical with regard to undesirable by-products, such as for example biuret, if the temperature of the exhaust gas is high enough. However, if the exhaust gas temperature is in the region of a critical temperature, the reaction equilibrium may be shifted in the direction of the generation of undesirable by-products. The target temperature with which the temperature of the structure is compared in step 1.5) should therefore be preset in such a way that at the target temperature the formation of the undesirable by-products, such as for example biuret, does not exceed a predeterminable level. It is preferable for the target temperature to be predetermined in such a way that only small amounts of undesirable by-products are formed.

The method according to the invention therefore takes into account the drop in temperature of the exhaust gas caused by the addition of the reducing agent precursor and/or the reducing agent and initiates possible measures to counteract this drop in temperature. In accordance with step 1.6a), one of these measures may reside in reducing the quantity of reducing agent to be added. This means that although not all of the nitrogen oxides which are present in the exhaust gas are then converted, depending on the operating state of the internal combustion engine, this may be acceptable. Another possible step of a measure to counteract the drop in temperature resides in increasing the temperature of the system, specifically, on one hand, in increasing the temperature of the structure located directly downstream of the reagent addition point and, on the other hand, the exhaust gas temperature. Since this requires active measures, such as for example electrical heating of the structure or increasing the exhaust gas temperature by changing the engine operating state or by injecting and oxidizing an additional quantity of fuel, this gives rise to a fundamentally undesirable secondary effect, for example an increased fuel consumption. The method according to the invention takes into account options 1.6a) and 1.6b) in such a way that the maximum possible conversion of the nitrogen oxides present in the exhaust gas takes place with the minimum possible increase in fuel consumption but without the temperature dropping below the target temperature.

In principle, the method according to the invention is based, for example, on the fact that due to the engine management, the nitrogen oxide contents of the exhaust gas upon leaving the internal combustion engine are always known. A certain time elapses before the exhaust gas reaches the SCR catalytic converter from downstream in the exhaust system, and this time can be used accordingly to determine the quantity of reagent that is to be added, and if appropriate also to take the measures listed in step 1.6). In particular, the method according to the invention can also be combined with an $NO_x$ adsorber, in which excess nitrogen oxide levels can be reversibly stored. Subsequent regeneration of the $NO_x$ adsorber can be planned in such a way as to convert the stored nitrogen oxides as completely as possible.

Step 1.6b.1) is to be understood as meaning that the temperature of the structure is increased to a sufficient extent for the temperature of the structure to be reliably kept above the target temperature despite the temperature dropping as a result of the addition of the reagent. In accordance with another mode of the invention, the structure includes a honeycomb body.

This may in particular be a ceramic honeycomb body and/or a metallic honeycomb body. In this context, honeycomb bodies which form passages through which a fluid, such as for example an exhaust gas, can flow are likewise preferred in this context.

In accordance with a further mode of the invention, the structure includes at least one of the following catalytic converters:
3.1) a hydrolysis catalytic converter and
3.2) an SCR catalytic converter.

In particular, when using an aqueous urea solution as a reducing agent precursor, the method according to the invention is advantageous if the structure includes a hydrolysis catalytic converter in accordance with variant 3.1), since in this case, in addition to the energy required for the chemical reaction, it is also necessary to apply the enthalpy of vaporization of the water, which leads to a further reduced temperature after addition of the reagent. Therefore, if a urea solution is used as a reducing agent precursor, there is an increased probability of the formation of undesirable by-products, such as for example biuret.

In accordance with an added mode of the invention, step 1.1) includes at least one of the following measures:
4.1) measuring the nitrogen oxide content, and
4.2) determining the nitrogen oxide emission from the engine characteristic data.

In particular if, in accordance with step 4.2), the nitrogen oxide emission is at least partially obtained from the engine characteristic data, it is advantageously possible to use the time which it takes for the exhaust gas to pass from the internal combustion engine to the SCR catalytic converter to carry out steps 1.1) to 1.6) of the invention. An engine map or the engine characteristic data is to be understood in particular as meaning the operational engine map of the internal combustion engine. The nitrogen oxide consumption can be calculated from the available and measurable or predetermined characteristic data of the engine, such as for example the load, engine speed, etc. According to option 4.1), the nitrogen oxide content may as an alternative or in addition also be measured by using a corresponding sensor. It is possible to provide a plurality of sensors, so that different measured values are present at different points of the exhaust system. These can be compared with the nitrogen oxide emission from engine characteristic data determined from option 4.2). In particular, it is also possible to construct a computer-aided model of the exhaust system, on the basis of which, through the use of measured supporting points with respect to the nitrogen oxide content in particular, the oxygen content and the temperature of the exhaust gas at least at one point of the exhaust system, the corresponding values can be determined in other regions of the exhaust system.

In accordance with an additional mode of the invention, step 1.2) includes at least one of the following measures:
5.1) measuring the temperature of the structure, and
5.2) calculating the temperature.

In this case too, it is possible to calculate the temperature of the structure, for example from the engine characteristic data and the known specific structure of the exhaust system. Furthermore, it is possible to determine the temperature of the structure, the temperature of another component in the exhaust system and/or the temperature of the exhaust gas itself and to determine the temperature from this information.

In accordance with yet another mode of the invention, the target temperature is at most 180° C., preferably between 120° C. and 170° C., and in particular approximately 160° C.

These temperatures have proven particularly advantageous for avoiding the formation of biuret from urea. These target temperatures in particular ensure in an especially advantageous way that clogging and closing-up of the passages at least of the structure can be effectively reduced to a significant extent or even substantially prevented.

In accordance with yet a further mode of the invention, step 1.6) is carried out iteratively.

In particular, if the nitrogen oxide content of the exhaust gas is at least partially calculated from the engine map, it is advantageously possible to opt for an iterative approach when carrying out step 1.6). That is because in this case, if the method is carried out with the aid of a computer and a suitably fast processor, a sufficient period of time is available to allow iterative determination of measures 1.6a) and 1.6b) and their effect on the temperature of the structure after addition of the quantity of reagent.

Depending on the particular configuration of the iterative process, in this way it is possible to achieve a very accurate procedure with regard to step 1.6). In particular, with relatively large iteration steps, it is possible, despite the iterative procedure, to achieve a very rapid drop below the target temperature after the addition of the quantity of reagent.

In accordance with yet an added mode of the invention, step 1.6) is carried out continuously.

Carrying out step 1.6) continuously has the advantage that the temperature can be made to drop below the target temperature very quickly. In particular, if relatively large gradients are used in measures 1.6a) and 1.6b), it is possible to ensure a rapid procedure.

In accordance with yet an additional mode of the invention, the step of carrying out the increase in temperature in accordance with step 1.6b.1) includes electrical heating of the structure.

In particular, the structure may include an electrically heatable honeycomb body. The electrical heating of the structure has the advantage that it is possible to achieve a very rapid increase in the temperature of the structure to above the target temperature, and therefore the formation of undesirable by-products, such as for example biuret, can be effectively prevented. The electrical heating of the structure allows a very dynamic adjustment and control process.

In accordance with again another mode of the invention, the execution of the increase in temperature in accordance with step 1.6b.2) includes at least one of the following measures:
10.1) changing the operating point of the internal combustion engine;
10.2) electrically heating the exhaust gas upstream of the structure, and
10.3) injecting and oxidizing hydrocarbons.

In accordance with step 10.1), a relatively minor change in the operating point of the internal combustion engine, which may involve a slightly increased fuel consumption, can be used to effect an increase in the exhaust gas temperature which can compensate for the drop in temperature caused by the addition of the reagent. In accordance with step 10.2), electrical heating of the exhaust gas can be effected, for example, through the use of an electrically heatable honeycomb body located upstream of the structure. In accordance with step 10.3), it is possible to effect an increase in the exhaust gas temperature and therefore an increase in the temperature of the structure for example by briefly operating the internal combustion engine in rich-burn mode and by using a corresponding oxidation catalytic converter in the exhaust section, in particular upstream of the structure.

In accordance with again a further mode of the invention, at least one of the following substances can be added as a reagent:
11.1) ammonia and
11.2) urea.

In this way it is advantageously possible in particular to prevent the formation of biuret on the structure.

In accordance with again an added mode of the invention, the quantity of reagent is reduced if a reducing agent content can be detected in the exhaust gas stream downstream of the SCR catalytic converter.

If it is possible to detect a reducing agent content downstream of the SCR catalytic converter, a superstoichiometric reducing agent content is present. In order to prevent this, in accordance with the invention, it is possible to reduce the quantity of reducing agent or reducing agent precursor to be added. In particular, an oxidation catalytic converter, which can be used to oxidize reducing agent that breaks through the SCR catalytic converter, may be disposed downstream of the SCR catalytic converter.

With the objects of the invention in view, there is also provided an exhaust system for an internal combustion engine. The exhaust system comprises an SCR catalytic converter, a reagent addition point for adding at least one of the following reagents: a reducing agent and a reducing agent precursor, a structure which the exhaust gas can at least flow around and which is disposed downstream of the reagent addition point, and a control device. The control device controls addition of the reagent when controlling a quantity of the reagent to be added as a function of at least one of the following variables:

13.1) exhaust gas temperature;
13.2) temperature of the structure and
13.3) nitrogen oxide content of the exhaust gas taking into account a change in at least one of the variables 13.1) and 13.2) caused by the addition of the quantity of reagent.

The details and refinements which have been disclosed in connection with the method according to the invention can also be transferred and applied to the exhaust system according to the invention. In particular, the exhaust system according to the invention can be used to carry out the method according to the invention.

Other features which are considered as characteristic for the invention are set forth in the appended claims.

Although the invention is illustrated and described herein as embodied in a method for the selective catalytic reduction of nitrogen oxides in the exhaust gas from an internal combustion engine, and an exhaust system, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

The FIGURE of the drawing is a schematic and fragmentary, diagrammatic, cross-sectional view of an exhaust system according to the invention for an internal combustion engine.

DESCRIPTION OF THE PREFERRED EMBODIMENTS

Referring now in detail to the single FIGURE of the drawing, without the invention being restricted to the exemplary embodiments shown therein and to the advantages disclosed, there is seen a diagrammatically-illustrated exhaust system 1 according to the invention for the exhaust gas of an internal combustion engine 2. The exhaust system 1 includes an SCR catalytic converter 3. A hydrolysis catalytic converter 4 is formed upstream of the SCR catalytic converter 3. A reagent addition point 5, which can be used to introduce a reducing agent and/or a reducing agent precursor into the exhaust system 1, is formed upstream of the hydrolysis catalytic converter 4. In this context, it is particularly preferable for the reagent addition point 5 to be used to add urea as a solid and/or in the form of an aqueous urea solution. The hydrolysis catalytic converter 4 in this case forms a structure which is formed directly downstream of the reagent addition point 5 and which the exhaust gas can at least flow around.

During operation, the nitrogen oxide content in the exhaust gas from the internal combustion engine 2 is determined. This can be done either by using an operational engine map of the internal combustion engine 2 or by determination of the nitrogen oxide content, for example through the use of a first measurement sensor 7. A quantity of reagent required for the reduction of the determined nitrogen oxide content is determined in accordance with a step 1.3), on the basis of the nitrogen oxide content that is determined in this way. The reagent in this case includes a reducing agent and/or a reducing agent precursor. Furthermore, the temperature of the hydrolysis catalytic converter 4 is determined, for example by using a second measurement sensor 8. As an alternative or in addition, it is possible to determine the temperature of the structure which a fluid can at least flow around, i.e. the hydrolysis catalytic converter 4, from the operating data of the internal combustion engine 2, by taking into account the known structure of the exhaust system 1. The temperature of the structure after addition of this quantity of reagent is determined based on the determined quantity of reagent. This temperature of the structure after addition is compared with a predeterminable target temperature. If the temperature of the structure after addition of the quantity of reagent is below the target temperature, the temperature of the structure is calculated by at least one of the following measures in accordance with a step 1.6):

1.6a) adding a reduced quantity of reagent, and
1.6b) increasing at least one of the following temperatures:
    1.6b.1) the temperature of the structure and
    1.6b.2) an exhaust gas temperature.

In this case, the quantity in step 1.6a) can be reduced continuously or iteratively or discontinuously, and the same applies to the temperatures that are to be increased. If the temperature of the structure after addition of the quantity of reagents, taking measures 1.6a), 1.6b) into account, is above the target temperature or corresponds to the target temperature, the quantity of reagent is added and if appropriate the temperature is increased accordingly. This can be done, for example, by heating the hydrolysis catalytic converter 4 or a honeycomb body 9 located upstream of the hydrolysis catalytic converter 4. The electrical heating can be done, for example, by an electrical heater 10 to which the honeycomb body 9 and/or the hydrolysis catalytic converter 4 is connected. An oxidation catalytic converter 11 may be formed downstream of the SCR catalytic converter 3, in order to convert any reducing agent which breaks through the SCR catalytic converter and therefore to prevent the reducing agent from being released to the environment. In order to monitor whether or not a breakthrough of reducing agent is occurring, a third measurement sensor 12, which can be used in particular to determine the concentration of reducing agent in the exhaust gas, is formed downstream of the SCR catalytic converter 3. If the third measurement sensor 12 indicates a significant concentration of reducing agent, the quantity of reagent being added is reduced. A control device 13, which is connected to the measurement sensors 7, 8, 12, the electrical heater 10, the internal combustion engine 2 and the reagent addition point 5 over signal lines 14, which are only indicated diagrammatically in the drawing, is provided for the purpose of carrying out the method. In the present exemplary embodiment, the signal lines 14 form a bus system with an addressable databus. In particular, the method according to the invention can be carried out in the control device 13. The control device 13 may, for example, be integrated in an engine control unit for the internal combustion engine.

The method according to the invention and the exhaust system 1 according to the invention advantageously allow the selective catalytic reduction of nitrogen oxides in the exhaust gas from an internal combustion engine 2, during which the formation of undesirable by-products, such as for example biuret if urea is used as a reducing agent precursor, is avoided as far as possible. This advantageously lengthens the service life of the exhaust system 1.

The invention claimed is:

1. A method for the selective catalytic reduction of nitrogen oxides ($NO_x$) in the exhaust gas from an internal combustion engine, the method comprising the following steps:
    0.1) providing an exhaust system for the exhaust gas from the internal combustion engine;
    0.2) providing an SCR catalytic converter in the exhaust system;
    0.3) providing a reagent addition point in the exhaust system upstream of the SCR catalytic converter for adding at least one of the following reagents:
        a) a reducing agent, or
        b) a reducing agent precursor;
    0.4) providing a structure which the exhaust gas can at least flow around, the structure being immediately downstream of the reagent addition point in the exhaust system and the structure including at least one of the following catalytic converters:
        3.1) a hydrolysis catalytic converter, or
        3.2) an SCR catalytic converter;
    decreasing an amount of reagent planned to be supplied to the structure and/or planning an increase in a temperature of the structure and maintenance of the planned amount of reagent, before supplying the reagent to the structure, for preventing the temperature of the structure from dropping below a predeterminable target temperature of at most 180° C., by:
    1.1) determining a nitrogen oxide content of the exhaust gas;
    1.2) determining the temperature of the structure;
    1.3) determining a quantity of reagent required for reduction of the nitrogen oxide content determined in step 1.1);
    1.4) determining a temperature of the structure after addition of the quantity of reagent;
    1.5) comparing the temperature of the structure with the target temperature;
    1.6) calculating the temperature of the structure using at least one of the following measures, if the temperature is lower than the target temperature:
        1.6a) adding a reduced quantity of reagent, or
        1.6b) increasing at least one of the following temperatures:
            1.6b.1) the temperature of the structure or
            1.6b.2) an exhaust gas temperature,
        until the temperature of the structure, after addition of the quantity of reagent, is greater than or equal to the target temperature; and
    1.7) adding the quantity of reagent through the reagent addition point.

2. The method according to claim 1, wherein the structure includes a honeycomb body.

3. The method according to claim 1, wherein step 1.1) includes at least one of the following measures:
    4.1) measuring the nitrogen oxide content, or
    4.2) determining the nitrogen oxide emissions from engine characteristic data.

4. The method according to claim 1, wherein step 1.2) includes at least one of the following measures:
    5.1) measuring the temperature of the structure, or
    5.2) calculating the temperature of the structure.

5. The method according to claim 1, wherein the target temperature is 120 to 170° C.

6. The method according to claim 1, wherein the target temperature is approximately 160° C.

7. The method according to claim 1, which further comprises carrying out step 1.6) iteratively.

8. The method according to claim 1, which further comprises carrying out step 1.6) continuously.

9. The method according to claim 1, wherein execution of the increase in temperature in accordance with step 1.6b.1) includes electrical heating of the structure.

10. The method according to claim 1, wherein execution of the increase in temperature in accordance with step 1.6b.2) includes at least one of the following measures:
    10.1) changing an operating point of the internal combustion engine;
    10.2) electrically heating the exhaust gas upstream of the structure; or
    10.3) injecting and oxidizing hydrocarbons.

11. The method according to claim 1, which further comprises adding at least one of the following substances as the reagent:
    11.1) ammonia or
    11.2) urea.

12. The method according to claim 1, which further comprises reducing the quantity of the reagent if a reducing agent content can be detected in an exhaust gas stream downstream of the SCR catalytic converter.

13. An exhaust system for an internal combustion engine, the exhaust system comprising:
    an SCR catalytic converter;
    a reagent addition point for adding at least one of the following reagents:
        a) a reducing agent or
        b) a reducing agent precursor;
    a structure which the exhaust gas can at least flow around, said structure being disposed downstream of said reagent addition point and said structure including at least one of the following catalytic converters:
        3.1) a hydrolysis catalytic converter, or
        3.2) an SCR catalytic converter; and
    a control device for controlling addition of the reagent when controlling a quantity of the reagent to be added as a function of at least one of the following variables:
        13.1) exhaust gas temperature;
        13.2) temperature of the structure or
        13.3) nitrogen oxide content of the exhaust gas
    taking into account a change in at least one of the variables 13.1) or 13.2) caused by the addition of the quantity of reagent;
    said control device decreasing an amount of reagent planned to be supplied to the structure and/or planning an increase in a temperature of the structure and maintenance of the planned amount of reagent, before supplying the reagent to the structure, for preventing the temperature of the structure from dropping below a predeterminable target temperature of at most 180° C.

14. The method according to claim 1, which further comprises increasing the temperature according to step 1.6b) in step 1.7).

* * * * *